US006302474B1

(12) United States Patent
Drysdale et al.

(10) Patent No.: US 6,302,474 B1
(45) Date of Patent: Oct. 16, 2001

(54) DOOR REINFORCEMENT DEVICE

(75) Inventors: Stephen Drysdale, Northampton (GB); Nancy Raykovitz; Steven Murray Foster, both of Rochester Hills, MI (US); Timothy Bland, Plymouth, MI (US); David Birt, Staffs (GB); John Robert Beaulieu, Cookeville, TN (US)

(73) Assignee: Meritor Light Vehicle Systems-France (FR)

( * ) Notice: Subject to any disclaimer, the term of this patent is extended or adjusted under 35 U.S.C. 154(b) by 0 days.

(21) Appl. No.: 09/640,338

(22) Filed: Aug. 16, 2000

(30) Foreign Application Priority Data

Aug. 17, 1999 (GB) .................................................. 9919297

(51) Int. Cl.⁷ .................................................. B62D 25/04
(52) U.S. Cl. .............................. 296/146.6; 296/5; 52/633; 49/502; 49/503
(58) Field of Search ........................ 296/146.6, 5; 52/633, 52/653.2, 655.1, 656.9; 293/115; 49/502, 503, 260

(56) References Cited

U.S. PATENT DOCUMENTS

| 3,868,141 | * | 2/1975 | Johnson | 296/146.6 |
|---|---|---|---|---|
| 4,434,580 | * | 3/1984 | Engelsberger et al. | 296/146.6 |
| 4,850,636 | * | 7/1989 | McLaren et al. | 296/146.6 |
| 5,417,470 | * | 5/1995 | Holt | 296/146.6 |
| 5,466,032 | * | 11/1995 | Clausen et al. | 296/146.6 |
| 5,755,484 | * | 5/1998 | Chou et al. | 296/146.6 |
| 5,908,216 | * | 6/1999 | Townsend | 296/146.6 |
| 5,992,922 | * | 11/1999 | Harbig et al. | 296/146.6 |
| 6,027,158 | * | 2/2000 | Yang | 296/146.6 |
| 6,053,565 | * | 4/2000 | Cho | 296/146.6 |
| 6,056,349 | * | 5/2000 | Seksaria et al. | 296/146.6 |
| 6,135,537 | * | 10/2000 | Giddons | 296/146.6 |
| 6,135,541 | * | 10/2000 | Geise et al. | 296/146.6 |

FOREIGN PATENT DOCUMENTS

| 004224303 | * | 1/1994 | (DE) . |
|---|---|---|---|
| 004237584 | * | 5/1994 | (DE) . |
| 000603445 | * | 6/1994 | (EP) . |
| 0773126 |   | 11/1996 | (EP) . |
| 0274294 |   | 8/1926 | (GB) . |
| 0491855 |   | 3/1936 | (GB) . |
| 0559897 |   | 9/1942 | (GB) . |
| 1116359 |   | 9/1964 | (GB) . |
| 002275660 | * | 9/1994 | (GB) . |
| 0060725 | * | 5/1981 | (JP) . |
| 0104468 | * | 6/1982 | (JP) . |
| 406255365 | * | 9/1994 | (JP) . |

OTHER PUBLICATIONS

Search Report Date Nov. 11, 1999.

\* cited by examiner

*Primary Examiner*—Joseph D. Pape
*Assistant Examiner*—Kiran B. Patel
(74) *Attorney, Agent, or Firm*—Carlson, Gaskey & Olds, P.C.

(57) ABSTRACT

A reinforcement module for a vehicle door comprises a plurality of elongate reinforcement members (1) and a plurality of connectors (2a, 2b and 2c). Each connector (2a, 2b and 2c) is engageable with the free end portions of at least two of the elongate reinforcement members (1) to connect those elongate reinforcement members together. The arrangement is such that at least one of the elongate reinforcement members (1) extends generally transversely with respect to at least one other elongate reinforcement member.

11 Claims, 2 Drawing Sheets

DOOR REINFORCEMENT DEVICE

BACKGROUND OF THE INVENTION

This invention relates to a reinforcement device for a door, and to a door including such a device. The invention relates, in particular, to a reinforced vehicle door which allows ingress and egress of a passenger into, and out of, a passenger compartment of a vehicle.

A vehicle door is conventionally constructed of a frame constituted by a metal plate having in-turned flanges at the ends thereof, a door panel fixed to the frame on the outside thereof, and an internal trim panel fixed to the inside surface of the frame. In order to strengthen such a vehicle door, particularly in order to protect passengers from side impacts, it is known to position a side impact beam within the vehicle door. Typically, this beam extends in the longitudinal direction of the vehicle, and is fixed to the frame by, for example, welded, rivets or bolts. Hinges are attached to one of the flanges of the frame, and a latch mechanism is secured to the other flange.

SUMMARY OF THE INVENTION

The aim of the invention is to provide a vehicle door having an improved resistance to side impacts.

According to a first aspect, the present invention provides a reinforcement device for a vehicle door, the reinforcement device comprising a first elongate reinforcement member, and a second elongate reinforcement member extending generally transversely with respect to the first elongate reinforcement member, the two elongate reinforcement members being fixed together, and being adapted for fixing to a frame of the vehicle door.

According to a second aspect, the present invention provides a reinforcement module for a vehicle door, the module comprising a plurality of elongate reinforcement members and a plurality of connectors, each connector being engageable with the free end portions of at least two of the elongate reinforcement members to connect said elongate reinforcement members together, the arrangement being such that at least one of the elongate reinforcement members extends generally transversely with respect to at least one other elongate reinforcement member.

Advantageously, the elongate reinforcement members and the connectors are arranged in a grid-like structure, and preferably the elongate reinforcement members of each pair of elongate reinforcement members extend at right-angles at one another.

In a preferred embodiment, there are twelve elongate reinforcement members, four L-shaped connectors, four T-shaped connectors and one X-shaped connector.

The elongate reinforcement members and the connectors may be made of mild steel, and each of the elongate reinforcement members may be a solid rod or tubular.

Conveniently, each of the connectors is generally solid, and is formed with respective sockets for receiving the free end portions of associated elongate reinforcement members. Alternatively, each of the connectors is of hollow construction.

The invention further provides a vehicle door having a door frame and a reinforcement module fixed thereto, the reinforcement module being as defined above.

Each of the connectors may be fixed to the door frame, for example by welding.

In a preferred embodiment, the door frame is constituted by a generally laminar plate formed with in-turned flanges at opposite sides thereof, one of said flanges supporting a pair of door hinges, and the other flange support a latch, wherein the hinges and the latch are fixed to adjacent elongate reinforcement members of the module.

BRIEF DESCRIPTION OF THE DRAWINGS

The invention will not be described in greater detail, by way of example, with reference to the accompanying drawings in which.

DETAILED DESCRIPTION OF THE PREFERRED EMBODIMENT

Figure 1:
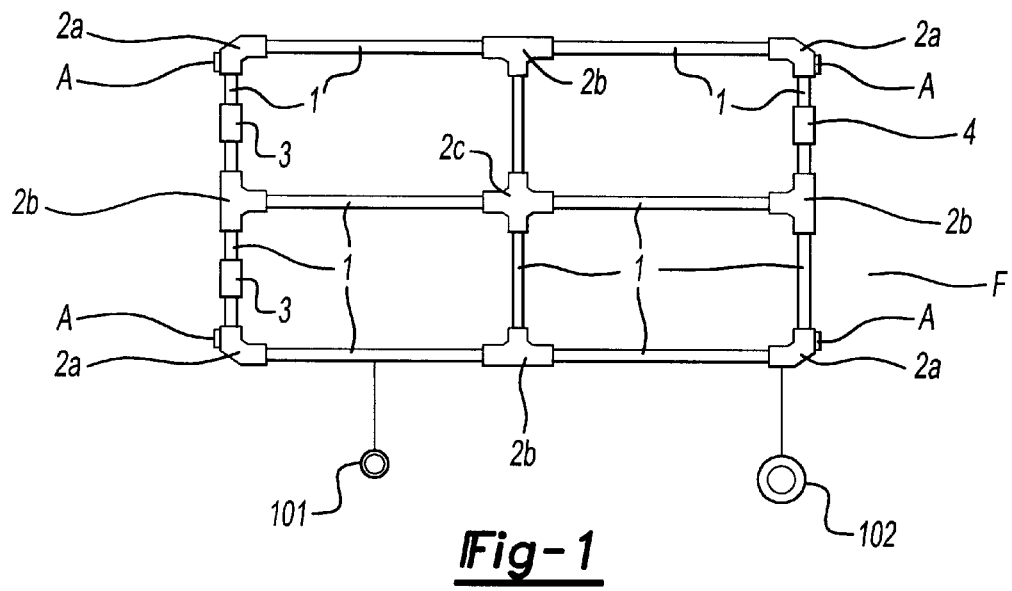
FIG. 1 illustrates a side elevation of a space frame strength module constructed in accordance with the invention, the module being for incorporation within the door of a vehicle.

Referring to the drawing, the space frame strength module is constituted by twelve rods 1, four L-shaped connectors 28, four T-shaped connectors 2b and an X-shaped connector 2c. The rods 1 are made of mild steel, and are cut to size from a long length of extruded or rolled rod. Each arm of each L-shaped connector 2a is formed with a socket at its end, each socket being sized to receive the free end portion of a rod 1 as a friction fit. Similarly, each arm of each T-shaped connector 2b is formed with a socket at its end, each socket being sized to receive the free end portion of a rod 1 as a friction fit. Finally, each arm of X-shaped connector 2c is formed with a socket at its end, each socket being sized to receive the free end portion of a rod 1 as a friction fit. Alternatively, the free ends of the rods 1 can be fixed within the sockets of the connectors 2a, 2b and 2c by welding, riveting or by any other suitable means such as an adhesive.

In use, the connectors 2a, 2b and 2c are fixed by attachments A to the frame (not shown) (illustrated schematically at F) of a vehicle door, for example by welding, rivets or bolts. It should be realized that one skilled in the art of door reinforcements will identify numerous locations and mounting arrangements within a vehicle door that will benefit from the present invention. This space frame strength module provides substantially greater strength than known side impact beams, as it provides a grid-like strengthening structure which extends over a major portion of the vehicle door. The module provides further strength in that two hinges 3 and a latch 4 of the door can be fixed to adjacent rods 1, so that side impact forces can additionally be transferred, at least partially, to adjacent parts of the frame of the vehicle, such as door posts.

As mentioned above, the lengths of the rods 1 are chosen to suit the particular door to which the module is to be fixed, the choice being such that the configuration of the module is such that none of the rods 1 or the connectors 2a, 2b and 2c interfere with the mechanisms which are normally provided within a vehicle door for operation of the latch 4 or its associated lock, or with any other components which are mounted within a vehicle door such as, for example, the speakers of an in-vehicle sound system.

Figure 2:
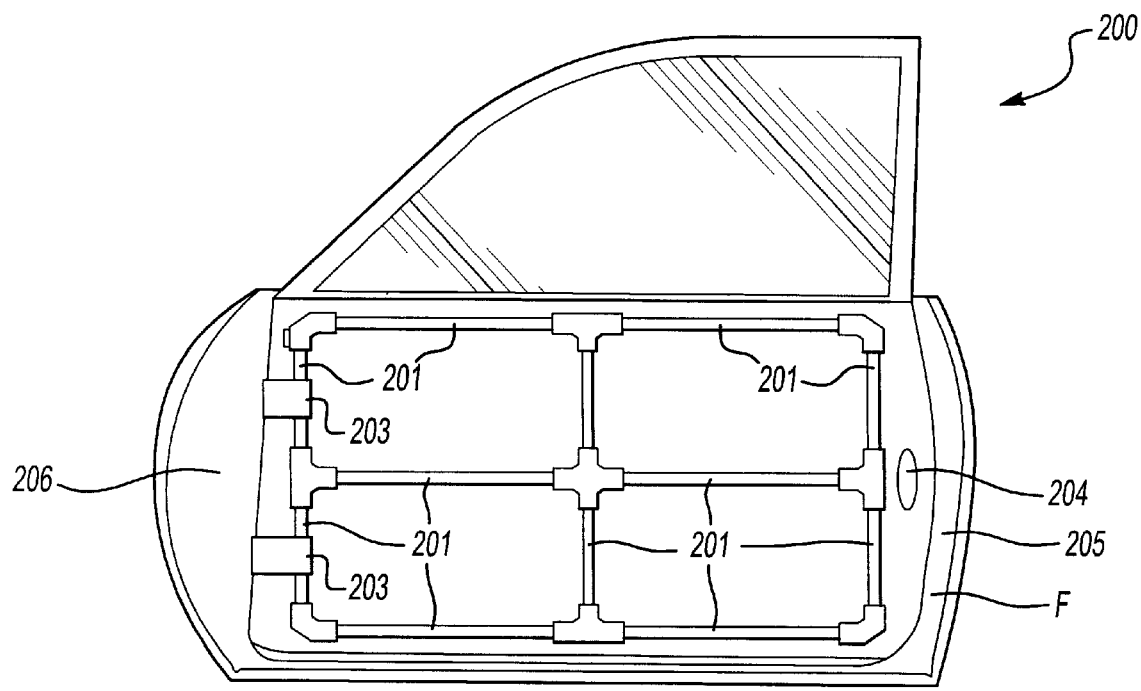
FIG. 2 illustrates a side elevation of a space frame strength module incorporated in a door of a vehicle.

FIG. 2 illustrates the space frame strength module incorporated in a vehicle door 200. The door frame F includes a generally laminar plate formed with in-turned flanges at opposite sides thereof, one of said flanges 206 supporting a pair of door hinges 203, and the other flange 205 supporting a latch 204, the hinges 203 and the latch 204 being fixed to adjacent elongate reinforcement members 201 of the module.

Figure 3:
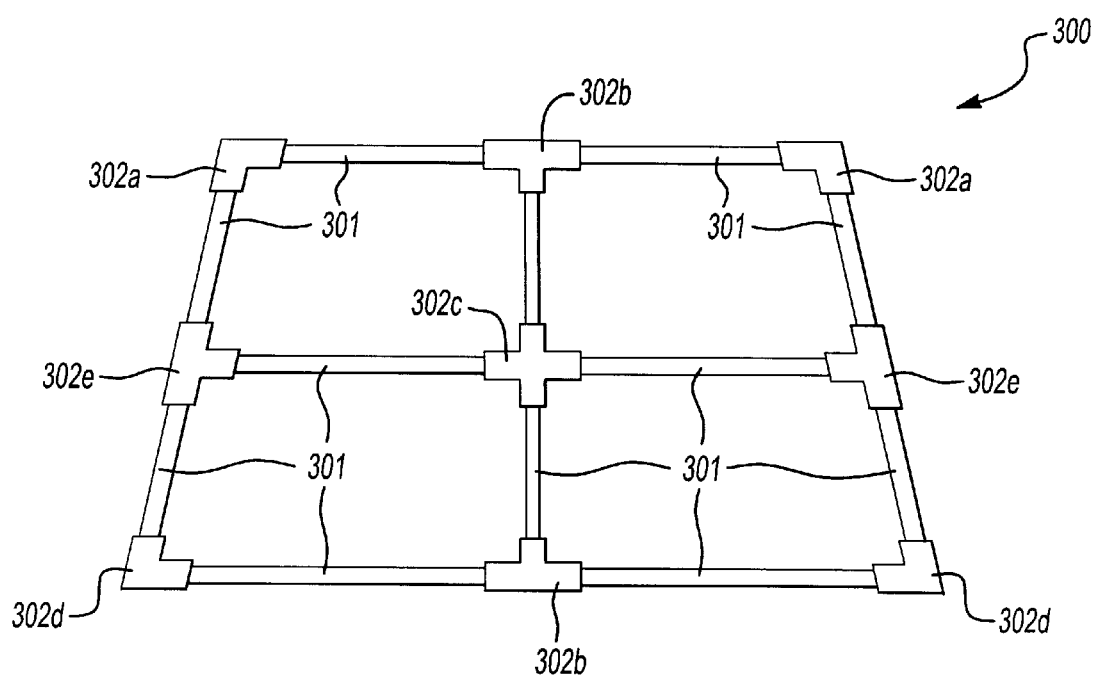
FIG. 3 illustrates a side elevation of an alternative embodiment of the space frame strength module.

It will be apparent that modification could be made of the module described above. For example, the rods and connectors could be made of other suitable materials than mild steel, and the rods themselves could be tubular. It would also be possible for each of the connectors 2a, 2b and 2c to be of a tubular configuration. A module 300 could also be constructed of trapezoidal configuration, as illustrated in FIG. 3, in which case the arms of at least some of the connectors would be angled at other than 90°. In this embodiment, the rods 301 are connected by connectors 302a, 302b, 302c, 302d and 302e. The connectors 302a, 302d and 302e would be substantially angled.

What is claimed is:

1. A vehicle door comprising:

a door frame; and a reinforcement module fixed to the door frame, said reinforcement module including a plurality of elongate reinforcement members and a plurality of connectors, each connector being engageable with the free end portions of at least two of the elongate reinforcement members to connect said elongate members together, at least one of the elongate reinforcement members extending generally transversely with respect to at least one other elongate reinforcement member.

2. The vehicle door as recited in claim 1 wherein each of the connectors is fixed to the door frame.

3. The vehicle door as recited in claim 2 wherein each of the connectors is welded to the door frame.

4. The vehicle door as claimed in claim 1, wherein the elongate reinforcement members and the connectors are arranged in a grid-like structure.

5. The vehicle door as claimed in claim 4, wherein each of the elongate reinforcement members extends at a right angle to at least one other elongate reinforcement member.

6. The vehicle door as claimed in claim 5, wherein said module includes twelve elongate reinforcement members, four L-shaped connectors, four T-shaped connectors and one X-shaped connector.

7. The vehicle door as claimed in claim 1, wherein the elongate reinforcement members and the connectors are made of mild steel.

8. The vehicle door as claimed in claim 1, wherein each of the elongate reinforcemnent members is a solid rod.

9. The vehicle door as claimed in claim 1, wherein each of the elongate reinforcement members is tubular.

10. The vehicle door as claimed in claim 1, wherein each of the connectors is generally solid and is formed with respective sockets for receiving the free end portions of associated elongate reinforcement members.

11. The vehicle door claimed in claim 1, wherein each of the connectors is of hollow construction.

* * * * *